United States Patent
Tokunaga

(10) Patent No.: US 9,307,102 B2
(45) Date of Patent: Apr. 5, 2016

(54) IMAGE FORMING APPARATUS, METHOD FOR DISPLAYING SCREEN, AND STORAGE MEDIUM

(71) Applicant: KYOCERA Document Solutions Inc., Osaka (JP)

(72) Inventor: Tomoharu Tokunaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/451,599

(22) Filed: Aug. 5, 2014

(65) Prior Publication Data

US 2015/0049362 A1 Feb. 19, 2015

(30) Foreign Application Priority Data

Aug. 19, 2013 (JP) .................................. 2013-169895

(51) Int. Cl.
*G06F 3/12* (2006.01)
*H04N 1/00* (2006.01)
*H04N 1/21* (2006.01)

(52) U.S. Cl.
CPC ....... *H04N 1/00384* (2013.01); *H04N 1/00408* (2013.01); *H04N 1/00416* (2013.01); *H04N 1/00663* (2013.01); *H04N 1/00668* (2013.01); *H04N 1/00684* (2013.01); *H04N 1/00687* (2013.01); *H04N 1/00694* (2013.01); *H04N 1/00771* (2013.01); *H04N 1/21* (2013.01)

(58) Field of Classification Search
None
See application file for complete search history.

(56) References Cited

U.S. PATENT DOCUMENTS

| | | | |
|---|---|---|---|
| 8,014,998 B2* | 9/2011 | Hashimoto | 704/8 |
| 2006/0221358 A1* | 10/2006 | Takahashi | 358/1.1 |
| 2006/0265671 A1* | 11/2006 | Shiono et al. | 715/859 |
| 2007/0127042 A1* | 6/2007 | Igarashi et al. | 358/1.1 |
| 2012/0243043 A1* | 9/2012 | Asai | 358/1.15 |
| 2013/0033716 A1* | 2/2013 | Suese | 358/1.13 |

FOREIGN PATENT DOCUMENTS

| | | | | |
|---|---|---|---|---|
| JP | 60-088972 A | 5/1985 | | |
| JP | 4-194873 A | 7/1992 | | |
| JP | 2000-153924 A | 6/2000 | | |
| JP | 2000153924 A | * 6/2000 | | B65H 1/00 |
| JP | 2002-240961 A | 8/2002 | | |
| JP | 2010-276738 A | 12/2010 | | |

OTHER PUBLICATIONS

An Office Action issued by the Japanese Patent Office on Nov. 4, 2015, which corresponds to Japanese Patent Application No. 2013-169895 and is related to U.S. Appl. No. 14/451,599.

* cited by examiner

*Primary Examiner* — Marivelisse Santiago Cordero
*Assistant Examiner* — Neil R McLean
(74) *Attorney, Agent, or Firm* — Studebaker & Brackett PC

(57) ABSTRACT

An image forming apparatus includes a storage section, an operating section, an assignment and management section, a press detecting section, and a display processing section. The storage section stores settings of a plurality of paper feed cassettes accommodating paper. The operating section has a plurality of operation keys to be pressed for inputting operation. The assignment and management section assigns the paper feed cassettes to the different operation keys to manage the respective paper feed cassettes. The press detecting section detects press of any of the operation keys. The display processing section displays, during the time when any of the operation keys is kept pressed, a setting check screen showing the settings of the paper feed cassette assigned to the operation key being pressed.

8 Claims, 9 Drawing Sheets

FIG. 3

| Key names | "0" key | "1" key | "2" key | "3" key | "4" key | "5" key |
|---|---|---|---|---|---|---|
| Paper feed cassettes | Paper feed cassette MP | Paper feed cassette 1 | Paper feed cassette 2 | Paper feed cassette 3 | Paper feed cassette 4 | Paper feed cassette 5 |
| Media types | Plain paper | Plain paper | Plain paper | Plain paper | Plain paper | Plain paper |
| Paper sizes | A4 | A6 | CU | ST | LT | B5 |
| Custom paper sizes | Optional | 4.13 × 5.83 | Optional | Optional | Optional | Optional |
| ... | ... | ... | ... | ... | ... | ... |

431

US 9,307,102 B2

IMAGE FORMING APPARATUS, METHOD FOR DISPLAYING SCREEN, AND STORAGE MEDIUM

INCORPORATION BY REFERENCE

The present application claims priority under 35 U.S.C. §119 to Japanese Patent Application No. 2013-169895, filed Aug. 19, 2013. The contents of this application are incorporated herein by reference in their entirety.

BACKGROUND

The present disclosure relates to image forming apparatuses, methods for displaying screens, and storage media that can allow checking of settings of paper feed cassettes through operation keys such as those of a numeric keypad.

Different sizes of paper is loaded in a plurality of paper feed cassettes in an image forming apparatus such as a digital multifunction peripheral. Such an image forming apparatus feeds paper from an appropriate paper feed cassette according to designation of a paper size or a paper feed cassette in printing.

The image forming apparatus displays settings of the paper feed cassettes on a liquid crystal display (LCD) screen to allow checking of the settings when the apparatus is on standby for printing, for example.

However, an LCD screen having a small display area is generally incapable of displaying settings of a plurality of paper feed cassettes at a time, and therefore goes through a switching operation to display detailed settings on a paper feed cassette by paper feed cassette basis.

For example, in a certain image forming apparatus, a paper feed cassette is selected through operation of a cassette selection key. The image forming apparatus turns on or off a lamp according to the presence or absence of paper in the paper feed cassette selected, and displays the size, the orientation, and the like of the paper if present.

The image forming apparatus can display detailed settings such as the size of paper through the selection of a paper feed cassette.

However, the image forming apparatus requires burdensome operation because the selection key needs to be pressed repeatedly until the desired paper feed cassette is selected for checking the settings of the paper feed cassette.

SUMMARY

An image forming apparatus according to the present disclosure includes a storage section, an operating section, an assignment and management section, a press detecting section, and a display processing section. The storage section stores settings of a plurality of paper feed cassettes accommodating paper. The operating section has a plurality of operation keys to be pressed for inputting operation. The assignment and management section assigns the paper feed cassettes to the different operation keys to manage the respective paper feed cassettes. The press detecting section detects press of the operation keys. The display processing section displays, during the time when any of the operation keys is kept pressed, a setting check screen showing the settings of the paper feed cassette assigned to the operation key being pressed.

A method for displaying a screen according to the present disclosure includes: storing settings of a plurality of paper feed cassettes accommodating paper; assigning the paper feed cassettes to different operation keys to be pressed for inputting operation to manage the respective paper feed cassettes; detecting press of any of the operation keys; displaying, during the time when any of the operation keys is kept pressed, a setting check screen showing the settings of the paper feed cassette assigned to the operation key being pressed.

A non-transitory computer-readable storage medium according to the present disclosure stores a display program configured to provide a computer with: a storing function of storing settings of a plurality of paper feed cassettes accommodating paper; an assigning and managing function of assigning the paper feed cassettes to different operation keys to be pressed for inputting operation to manage the respective paper feed cassettes; a press detecting function of detecting press of any of the operation keys; a display processing function of displaying, during the time when any of the operation keys is kept pressed, a setting check screen showing the settings of the paper feed cassette assigned to the operation key being pressed.

BRIEF DESCRIPTION OF THE DRAWINGS

FIG. 3 is a diagram showing a data structure of an assignment and management table in the image forming apparatus according to the embodiment of the present disclosure.

DETAILED DESCRIPTION

An image forming apparatus according to an embodiment of the present disclosure displays, during the time when an operation key is kept pressed, a setting check screen showing settings of a paper feed cassette assigned to the operation key. Thus, the settings of the paper feed cassette can be easily checked through simple operation.

The present disclosure can be applied to image forming apparatuses such as digital multifunction peripherals and printers including a small-sized liquid crystal display device and a limited number of operation keys such as a numeric keypad, for example.

Hereinafter, an image forming apparatus according to an embodiment of the present disclosure will be described with reference to the accompanying drawings.

[Configuration of Image Forming Apparatus]

Figure 1:
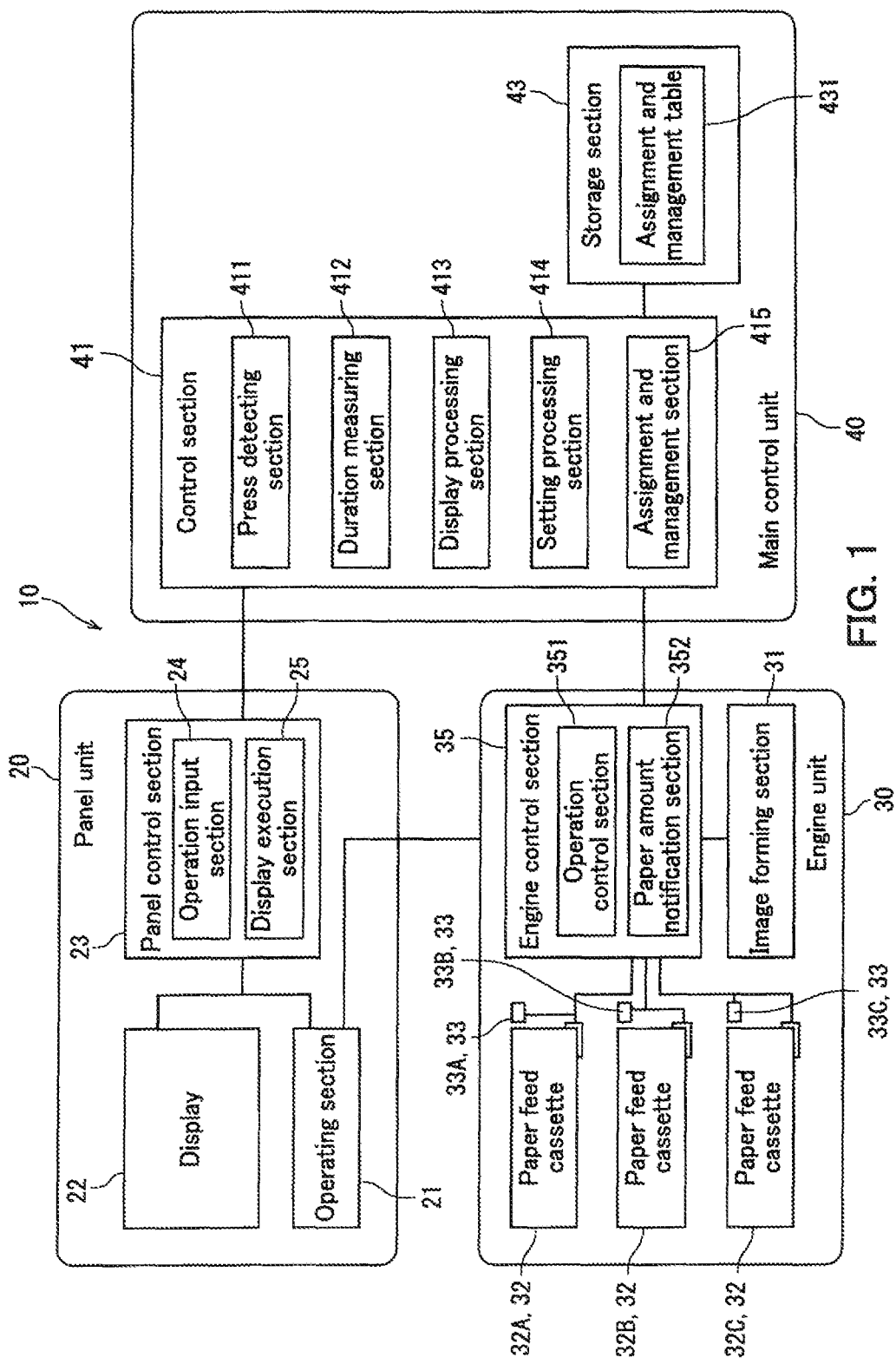
FIG. 1 is a block diagram showing a configuration of an image forming apparatus according to an embodiment of the present disclosure.
Figure 2:
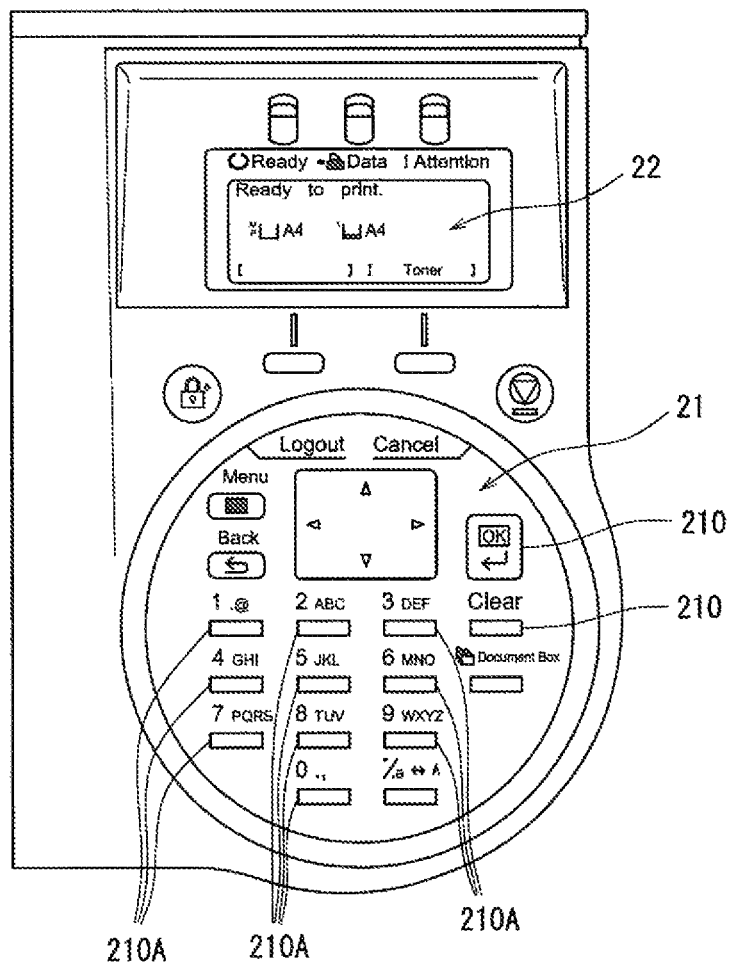
FIG. 2 is a front view showing an outward configuration of an operating section and its neighbor in the image forming apparatus of the embodiment of the present disclosure.

FIG. 1 is a block diagram showing a configuration of an image forming apparatus 10 according to the present embodiment. FIG. 2 is a diagram showing an outward configuration of an operating section and its neighbor in the image forming apparatus 10.

The image forming apparatus 10 is a digital multifunction peripheral, for example, and has various functions such as a printing function, a copy function, and a facsimile function. The image forming apparatus 10 includes a panel unit 20, an engine unit 30, a main control unit 40, and so on as well as components corresponding to the various functions. The components corresponding to the various functions are not shown in FIG. 1.

The panel unit 20 includes an operating section 21, a display 22, a panel control section 23, and so on.

The operating section 21 has operation keys 210 such as, for example, keys of a numeric keypad (numeric keys) 210A, an "OK" key, a "Back" key, and a cursor key as shown in FIG. 2. The image forming apparatus 10 receives input operation through press of each of the operation keys 210 (including the keys of the numeric keypad 210A).

The display 22 includes a liquid crystal display device or the like disposed in the vicinity of the operating section 21 (e.g., above the operating section 21 in FIG. 2) as shown in FIG. 2. The display 22 displays a result of input from the operating section 21 into the image forming apparatus 10, the state of the image forming apparatus 10, and so on.

The panel control section 23 shown in FIG. 1 includes a computing device such as a processor. The panel control section 23 is operable as an operation input section 24 through execution of a computer program.

The operation input section 24 provides an operation input function and receives input according to press or release of any of the operation keys 210 in the operating section 21. The input received is notified to the main control unit 40.

The panel control section 23 is operable as a display execution section 25 through execution of a computer program. The display execution section 25 displays on the display 22 a result of processing in the main control unit 40 based on the input received by the operation input section 24 according to the operation of the operation key 210. Specifically, the display execution section 25 receives bitmap screen data as the processing result from the main control unit 40 and displays a screen based on the screen data.

The engine unit 30 operates to form an image on paper based on image data. The engine unit 30 includes an image forming section 31, a plurality of paper feed cassettes 32 (only paper feed cassettes 32A, 32B, and 32C are shown in FIG. 1 for convenience), paper amount sensors 33 (likewise, only paper amount sensors 33A, 33B, and 33C are shown), an engine control section 35, and so on.

The image forming section 31 forms an image on paper under control by the engine control section 35.

The paper feed cassettes 32 can accommodate different sizes of paper. The paper feed cassettes 32 feed the paper in a timely manner for an image formation process in the image forming section 31.

The paper amount sensors 33 are sensors to mechanically or optically, for example, detect the amount of paper remaining in their corresponding paper feed cassettes 32.

The engine control section 35 includes a computing device such as a processor. The engine control section 35 is operable as an operation control section 351 through execution of a computer program. The operation control section 351 processes image data according to a printing job into printing image data and controls the operation of the image forming section 31 according to the printing image data, for example. The engine control section 35 is also operable as a paper amount notification section 352 through execution of a computer program. The paper amount notification section 352 notifies the main control unit 40 of the amounts of paper remaining in the respective paper feed cassettes 32 detected by the paper amount sensors 33.

The main control unit 40 performs overall control of the image forming apparatus 10. The main control unit 40 has a control section 41 and a storage section 43.

The control section 41 is a computing device such as a Central Processing Unit (CPU). The storage section 43 (readable storage medium) includes a ROM for storing a program, a RAM as a work area, a Hard Disk Drive (HDD) as an auxiliary storage device, or the like.

In the image forming apparatus 10, the control section 41 is operable as an assignment and management section 415, a press detecting section 411, a duration measuring section 412, a display processing section 413, and a setting processing section 414 through execution of a program in the storage section 43.

The assignment and management section 415 provides an assigning and managing function. The assignment and management section 415 assigns the paper feed cassettes 32 to different operation keys 210 to manage the respective paper feed cassettes 32. Specifically, the assignment and management section 415 manages the settings of the paper feed cassettes 32 assigned to the operation keys 210 of the operating section 21 using an assignment and management table 431 provided in the storage section 43, for example. The settings of the paper feed cassettes 32 are stored in the storage section 43. The storage section 43 therefore provides a storing function of storing the settings of the paper feed cassettes 32 accommodating paper.

The press detecting section 411 provides a press detecting function. The press detecting section 411 detects press of the numeric keypad 210A of the operation keys 210 in the operating section 21 via notification from the operation input section 24.

The duration measuring section 412 provides a duration measuring function. The duration measuring section 412 measures a duration that any of the keys of the numeric keypad 210A to which the paper feed cassettes 32 are assigned is kept pressed.

The display processing section 413 provides a display processing function. The display processing section 413 displays a screen on the display 22 via the display execution section 25 in the panel unit 20.

The display processing section 413 displays, as a standby screen (see FIG. 5), icon images representing the respective paper feed cassettes 32 and including identification information of the keys of the numeric keypad 210A when the image forming apparatus 10 is in a standby state.

In addition, during the time when any of the keys of the numeric keypad 210A is kept pressed in the operating section 21, the display processing section 413 displays a setting check screen (see FIG. 6) based on the result of the detection of key press in the numeric keypad 210A by the press detecting section 411. The setting check screen shows the settings of the paper feed cassette 32 assigned to the key of the numeric keypad 210A being pressed.

Furthermore, the display processing section 413 displays a setting screen (see FIG. 7) when the duration that the key of the numeric keypad 210A is kept pressed as measured by the duration measuring section 412 is longer than a predetermined period of time (when the key of the numeric keypad 210A is held down). The settings of the paper feed cassette 32 assigned to the key of the numeric keypad 210A being pressed can be made on the setting screen.

Furthermore, the display processing section 413 displays a transition duration meter 531 (see FIG. 6) on the setting check screen based on the duration that the key of the numeric keypad 210A is kept pressed and the predetermined period of time. The transition duration meter 531 shows the transition duration before the setting screen is displayed.

The setting processing section 414 provides a setting processing function. The setting processing section 414 receives input of the settings of the paper feed cassettes 32 on the setting screen displayed on the display 22 and executes the settings. The input of the settings can be performed through the operating section 21.

FIG. 3 is a diagram showing an example of a data structure of the assignment and management table 431. Relations between the keys of the numeric keypad 210A of the operation keys 210 in the operating section 21 and the paper feed cassettes are stored (registered) in the assignment and management table 431. That is, paper feed cassettes MP, 1, 2, 3, 4, and 5 are related (assigned) to "0", "1", "2", "3", "4", and "5" keys of the numeric keypad 210A, respectively. The paper feed cassette MP is a manual paper feed cassette.

In addition, paper attribute information such as, for example, type of medium (paper type), paper size, and custom paper size is registered in relation to the paper feed cassettes MP, 1, 2, 3, 4, and 5 as the settings of the paper loaded in the respective paper feed cassettes 32.

[Display Processing Based on Hold of Operation Key]

Figure 4:
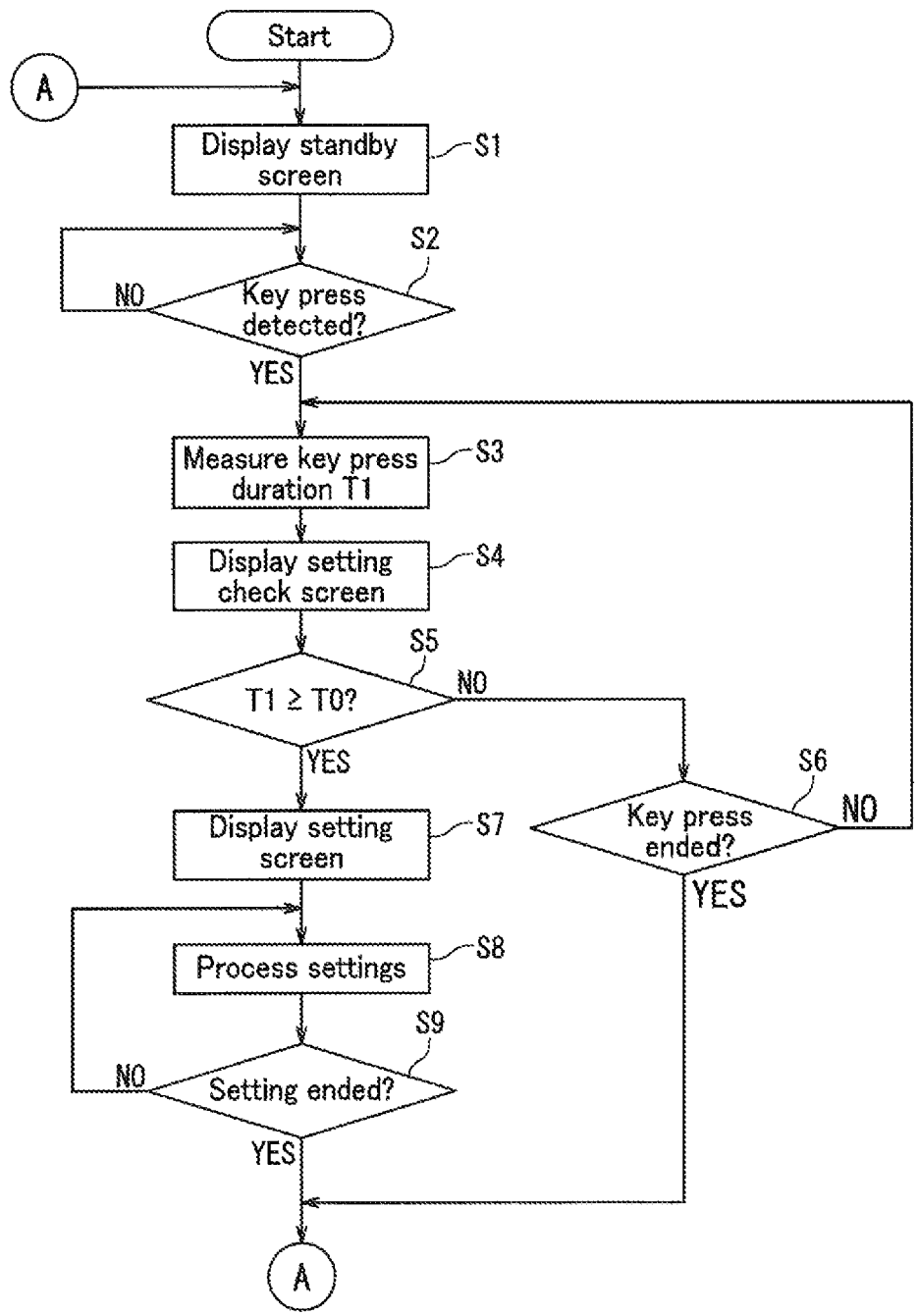
FIG. 4 is a flowchart showing display processing based on operation of a key in the image forming apparatus according to the embodiment of the present disclosure.

FIG. 4 is a flowchart showing display processing based on operation of a key in the image forming apparatus 10.

The display processing is started from a standby state of the image forming apparatus 10. Specifically, a "standby screen" is displayed in Step S1. That is, the display processing section 413 in the main control unit 40 displays the standby screen on the display 22 via the panel control section 23.

Figure 5:
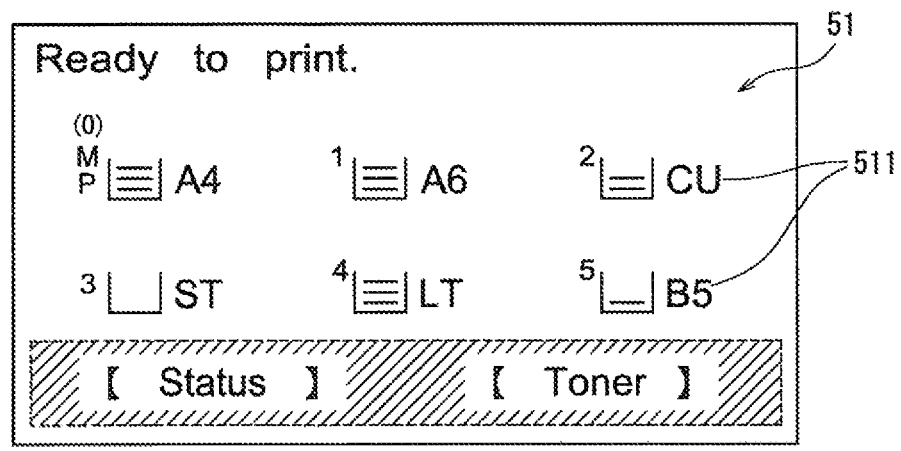
FIG. 5 is a diagram showing an example of a standby screen to be displayed when the image forming apparatus according to the embodiment of the present disclosure is in a standby state.

FIG. 5 is a diagram showing an example of a standby screen 51 to be displayed on the display 22 of the image forming apparatus 10.

The standby screen 51 shows icon images (hereinafter, referred to as cassette icons) 511 for all the paper feed cassettes 32 included in the image forming apparatus 10. Each of the cassette icons 511 includes at least identification information of a key of the numeric keypad 210A (number of the key of the numeric keypad 210A) and identification information of the corresponding paper feed cassette 32 (type (MP (0), 1, 2, 3, 4, or 5)). In the image forming apparatus 10, the identification information of the paper feed cassettes 32 is used as-is as the identification information of the corresponding keys of the numeric keypad 210A.

Each of the cassette icons 511 further includes and collectively shows the size and amount of the paper remaining in the paper feed cassette 32 assigned to the corresponding key of the numeric keypad 210A.

For displaying the standby screen 51, the display processing section 413 acquires from the assignment and management table 431 information of the paper sizes and the keys of the numeric keypad 210A to which the respective paper feed cassettes 32 are assigned. The display processing section 413 also acquires detection values (amounts of remaining paper) for the respective paper feed cassettes 32 that are provided by the respective paper amount sensors 33 and notified by the engine unit 35.

Thereafter, bitmap screen data of the standby screen 51 including the cassette icons 511 of the respective paper feed cassettes 32 is generated based on the information acquired for the respective paper feed cassettes 32. The display processing section 413 then displays the standby screen 51 on the display 22 via the display execution section 25 in the panel unit 20.

In the case of the standby screen 51 shown in FIG. 5, the paper feed cassettes MP (manual paper feed cassette), 1, 2, 3, 4, and 5 are assigned to the "0", "1", "2", "3", "4", and "5" keys of the numeric keypad 210A, respectively. It is therefore possible to visually check that the paper of A4, A6, CU (Custom), ST (Statement), LT (Letter), and B5 sizes are loaded in the paper feed cassettes MP (0), 1, 2, 3, 4, and 5, respectively. It is also possible to visually check approximate amounts of the paper remaining in the paper feed cassettes MP, 1, 2, 3, 4, and 5 by viewing the corresponding cassette icons 511.

The standby screen may show the cassette icons 511 of the paper feed cassettes 32 assigned to the keys of the numeric keypad 210A in an arrangement corresponding to the arrangement in the numeric keypad 210A.

The processing flows to Step S2 while the standby screen 51 is kept displayed by maintaining the standby state in Step S1 as described above.

As shown in FIG. 4, Step S2 is to determine whether or not press of a key is detected. Specifically, the press detecting section 411 in the main control unit 40 determines whether or not a key of the numeric keypad 210A is pressed. That is, the press detecting section 411 determines whether or not press of a key of the numeric keypad 210A is notified by the operation input section 24 in the panel unit 20.

When a key of the numeric keypad 210A is pressed, then the processing flows to Step S3 (YES). When a key of the numeric keypad 210A is not pressed, then Step 2 is repeated (NO).

In Step S3, a key press duration T1 is measured. Specifically, the duration measuring section 412 in the main control unit 40 starts measuring the time elapsed after press of a key of the numeric keypad 210A is detected in Step S2, that is, the key press duration T1 during which the key of the numeric keypad 210A is kept pressed. Once the measurement of the key press duration T1 is started, Steps S4 and S5 are performed concurrently.

In Step S4, the setting check screen is displayed. Specifically, the display processing section 413 in the main control unit 40 displays on the display 22 the setting check screen showing the settings (see FIG. 3) of the paper feed cassette 32 assigned to the key of the numeric keypad 210A of which press is detected by the press detecting section 411 in Step S2.

That is, the display processing section 413 in the main control unit 40 retrieves from the assignment and management table 431 the settings made for the paper feed cassette 32 assigned to the key of the numeric keypad 210A being pressed to display the setting check screen on the display 22.

The display processing section 413 then generates bitmap screen data including the retrieved settings developed into a bitmap. The display processing section 413 then displays the bitmap screen data including the settings developed into a bitmap as the setting check screen via the display execution section 25 in the panel unit 40.

The setting check screen is kept displayed as long as the key of the numeric keypad 210A is kept pressed. The setting check screen shows the transition duration meter 531 based on the result of the key press duration measurement by the duration measuring section 412.

Figure 6:
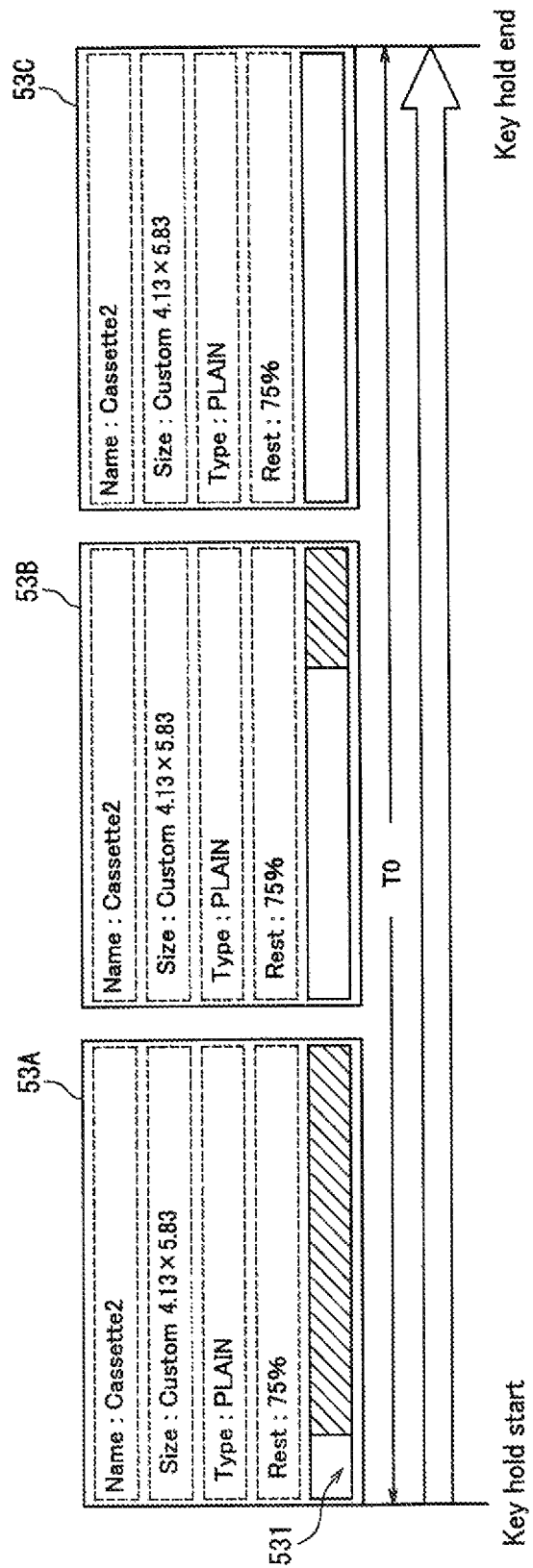
FIG. 6 is a diagram showing an example of a setting check screen to be displayed during the time when an operation key is kept pressed in the image forming apparatus according to the embodiment of the present disclosure.

FIG. 6 is a diagram showing an example of the setting check screen to be displayed during the time when the key of the numeric keypad 210A is kept pressed. In FIG. 6, the flow of time from the start of the key press in the numeric keypad 210A is represented by an arrow extending from the left end (key hold start) of FIG. 6 to the right end (key hold end) of FIG. 6. The example of the setting check screen transits on the display 22 from a setting check screen 53A through a setting check screen 53B to a setting check screen 53C in sequence with time.

The setting check screens 53A, 53B, and 53C show the settings of the paper feed cassette 32 assigned to the key of the numeric keypad 210A pressed in Step S2. In the case of FIG. 6, the setting check screens 53A, 53B, and 53C show the settings including the size (Size) and the type of medium (Type) of the paper, and the amount of remaining paper (Rest) in the paper feed cassette 2 ("Cassette 2") assigned to the "2" key of the numeric keypad 210A.

The setting check screens 53A, 53B, and 53C show the transition duration meter 531. The transition duration meter 531 shows a remaining time (transition duration) before the key press in the numeric keypad 210A reaches a predetermined period of time with a length of an image. As the predetermined period of time, a duration T0 is set, for example. That is, the transition duration at the time of the start of the key press in the numeric keypad 210A is the duration T0.

In the case of FIG. 6, the transition duration meter 531 shows the predetermined period of time T0 with a horizontally long meter area (whole area), the key press duration T1 in the numeric keypad 210A with a white part of the meter area, and the remaining time (transition duration) with a black part of the meter area. The setting check screen transits from 53A through 53B to 53C with a lapse of time represented by the arrowed direction. Thus, it is possible to visually check on the transition duration meter 531 that the remaining time before the predetermined period of time T0 is reached gradually decreases.

After completion of Step S4, whether or not T1≥T0 is true is determined in Step S5 as shown in FIG. 4. Specifically, the display processing section 413 in the main control unit 40 compares the key press duration T1 that the duration measuring section 412 started measuring in Step S3 with the predetermined period of time T0 to determine whether or not the key press duration T1 is equal to or longer than the predetermined period of time T0.

When the key press duration T1 is shorter than the predetermined period of time T0 (NO), then the processing flows to Step S6. When the key press duration T1 is equal to or longer than the predetermined period of time T0 (YES), then the processing flows to Step S7.

In Step S6, whether or not the key press is ended is determined. Specifically, the display processing section 413 in the main control unit 40 determines whether or not the key press in the numeric keypad 210A started in Step S2 is ended based on the result of the detection of key press in the numeric keypad 210A by the press detecting section 411.

When the key press in the numeric keypad 210A is ended (YES), then the processing flows Step S1 where the apparatus is in the standby state. When the key press in the numeric keypad 210A is not ended (NO), then Steps S3, S4, and S5 are repeated.

When the processing flows from Step S6 to Step S1 where the apparatus is in the standby state, the setting check screen 53 (see FIG. 6) is switched to the standby screen 51 (see FIG. 5).

In Step S7, the setting screen is displayed. Specifically, the display processing section 413 in the main control unit 40 displays the setting screen on which settings of the paper feed cassette 32 assigned to the key of the numeric keypad 210A kept pressed (held) for the predetermined period of time T0 are made.

At the same time, the display processing section 413 in the main control unit 40 retrieves from the storage section 43 data for formatting the setting screen for the paper feed cassette 32. The formatting data is then developed into a bitmap to generate bitmap screen data. Thus, the display processing section 413 displays the setting screen on the display 22 via the display execution section 25 in the panel unit 20.

Figure 7:
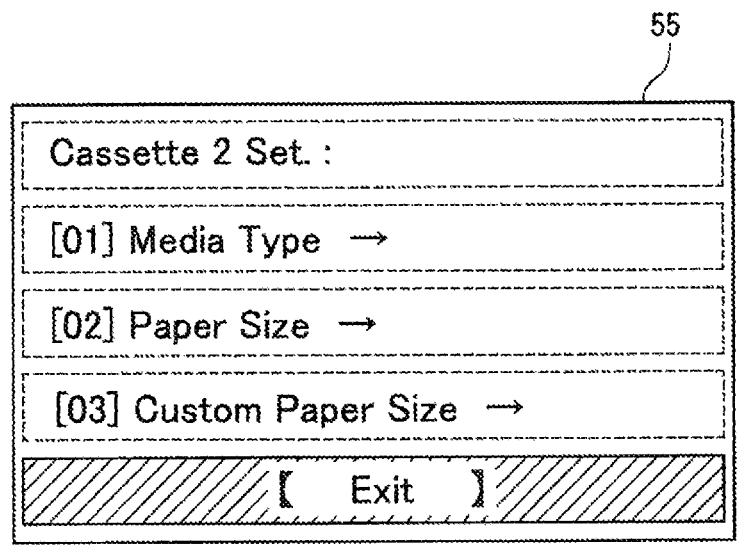
FIG. 7 is a diagram showing an example of a setting screen for a paper feed cassette to be displayed when an operation key is held down in the image forming apparatus according to the embodiment of the present disclosure.

FIG. 7 is a diagram showing an example of the setting screen for the paper feed cassette 32 to be displayed in response to the key hold in the numeric keypad 210A.

A setting screen 55 shows a name of the paper feed cassette for which settings are to be made ("Cassette 2" in this example), and various settings such as "Media Type (type of paper), "Paper Size (size of paper)", and "Custom Paper Size (size of custom paper)" that can be made for the paper feed cassette 32.

Once the setting screen 55 has been displayed in Step S7 as described above, the processing flows to Step S8.

In Step S8, as shown in FIG. 4, settings are made. Specifically, the setting processing section 414 receives input by a user through the setting screen 55 displayed in Step S7. The input is performed by the user through operation of the keys in the operating section 21. The input represents settings such as attributes of the paper for the paper feed cassette 32.

For example, detailed settings such as "plain paper", "A4", and "optional" are input as the settings "Media Type", "Paper Size", and "Custom Paper Size" on the setting screen 55, respectively.

Once Step S8 is completed as described above, the processing flows to Step S9.

In Step S9, whether or not the settings have been made is determined Specifically, the setting processing section 414 in the main control unit 40 determines whether or not an end-of-setting indication is given through operation of the "OK" key of the operation keys 210 in the operating section 21 in the panel unit 20.

When the end-of-setting indication is not given (NO), then Step S8 is repeated.

When the end-of-setting indication is given, then the setting processing section 414 in the main control unit 40 registers the input detailed settings to the assignment and management table 431 (YES), and the processing returns to Step S1 where the apparatus is in the standby state.

The image forming apparatus 10 according to the embodiment of the present disclosure has been described with reference to FIGS. 1 to 7.

The image forming apparatus 10 includes the storage section 43, the assignment and management section 415, the press detecting section 411, and the display processing section 413. The storage section 43 stores the settings of the paper feed cassettes 32 accommodating paper. The assignment and management section 415 assigns the paper feed cassettes 32 to keys of the numeric keypad 210A to be pressed for inputting operation to manage the respective paper feed cassettes 32. The press detecting section 411 detects key press in the numeric keypad 210A. The display processing section 413 displays, during the time when a key of the numeric keypad 210A is kept pressed, the setting check screen showing settings of the paper feed cassette 32 assigned to the key.

It is therefore possible to readily and reliably grasp the detailed settings of the paper feed cassette 32 assigned to the key being held by just pressing and holding a key of the numeric keypad 210A to which the desired paper feed cassette 32 is assigned.

The image forming apparatus 10 further includes the duration measuring section 412. The duration measuring section 412 measures the key press duration during which a key of the numeric keypad 210A is kept pressed. When the key press duration T1 is longer than the predetermined period of time T0, the display processing section 413 displays the setting screen 55 on which the settings of the paper feed cassette 32 assigned to the key of the numeric keypad 210A being pressed are made.

By holding a key of the numeric keypad 210A to which the desired paper feed cassette 32 is assigned for the predetermined period of time, therefore, it is possible to easily start making settings while checking the presence or absence of an alternation to the settings of the paper feed cassette 32 assigned to the key of the numeric keypad 210A being held.

The display processing section 413 in the image forming apparatus 10 displays, based on the key press duration T1 and the predetermined period of time T0, the transition duration meter 531 on the setting check screen 53 as a result of the duration measurement indicating the transition duration before the setting screen 55 is displayed.

It is therefore possible to grasp the duration before the setting screen 53 is displayed while checking the detailed settings of the paper feed cassette 32 by pressing the corresponding key of the numeric keypad 210A. Accordingly, it is possible to prevent the setting screen 53 from being displayed unnecessarily (when it is unnecessary) by releasing the key of the numeric keypad 210A with checking the transition duration meter 531.

In addition, the display processing section 413 in the image forming apparatus 10 displays the cassette icons 511 representing the respective paper feed cassettes 32 and including the identification information of the keys of the numeric keypad 210A to which the paper feed cassettes 32 are assigned as well as the identification information of the paper feed cassettes 32 during the time when the image forming apparatus 10 is in the standby state.

The user is therefore able to reliably have the settings of a desired paper feed cassette 32 displayed through operation of a key of the numeric keypad 210A while checking the cassette icons 511.

The assignment and management section 415 assigns the paper feed cassettes 32 to the keys of the numeric keypad 210A. The display processing section 413 may display the cassette icons 511 of the paper feed cassettes 32 assigned to the keys of the numeric keypad 210A in an arrangement corresponding to the arrangement in the numeric keypad 210A.

In this case, the user can readily have the settings of a desired paper feed cassette 32 displayed through intuitive operation of a key of the numeric keypad 210A since the arrangement of the cassette icons 511 is corresponding to the arrangement in the numeric keypad 210A.

[Variations]

Figure 8:
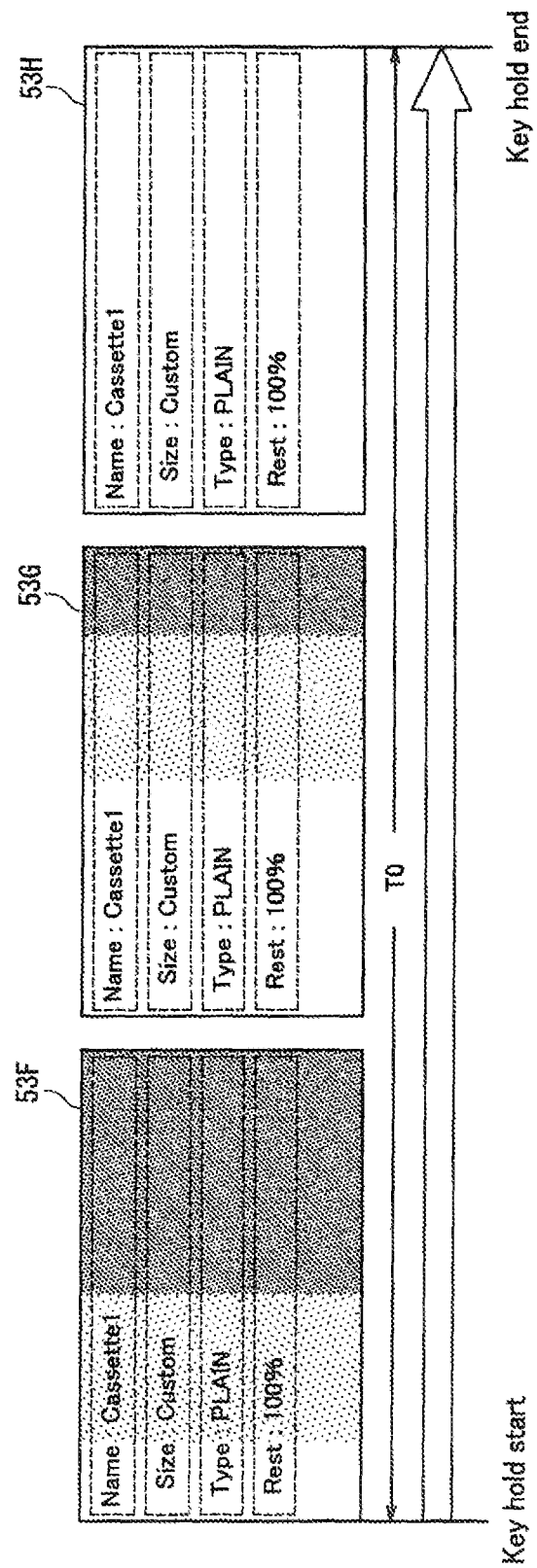
FIG. 8 is a diagram showing an example of a setting check screen to be displayed during the time when an operation key is kept pressed in an image forming apparatus according to a variation of the embodiment of the present disclosure.
Figure 9:
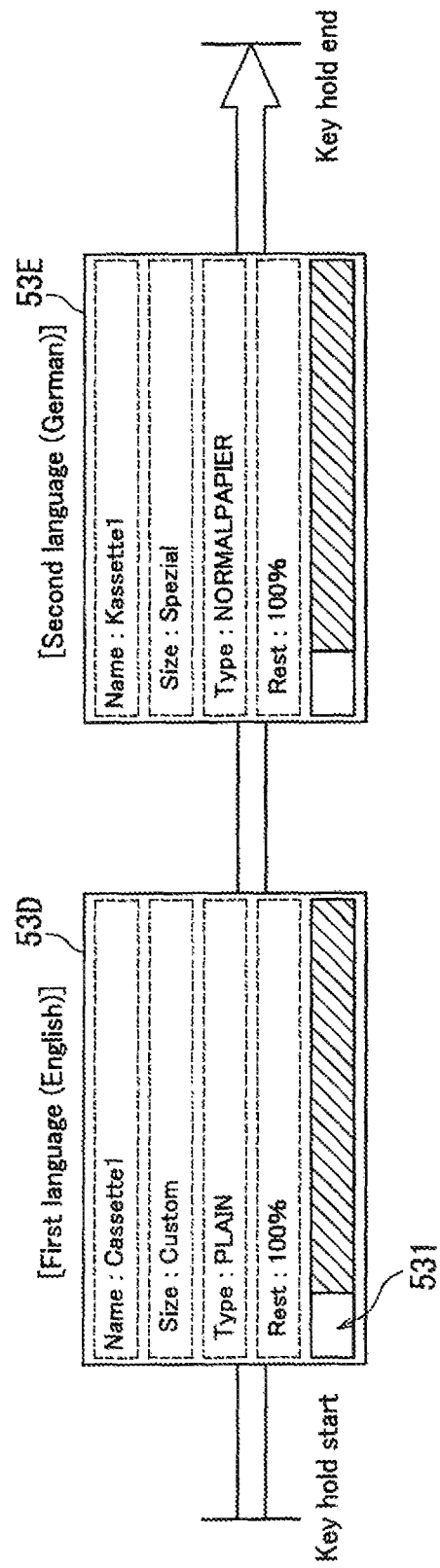
FIG. 9 is a diagram showing an example of a setting check screen to be displayed during the time when an operation key is kept pressed in an image forming apparatus according to another variation of the embodiment of the present disclosure.

FIGS. 8 and 9 are diagrams showing setting check screens according to variations of the embodiment of the present disclosure.

The setting check screen according to the variation shown in FIG. 8 shows the transition duration before the setting screen 55 (see FIG. 7) is displayed by gradationally changing the background color of the display 22 instead of using the transition duration meter 531 of the setting check screen 53 shown in FIG. 6.

In the case of FIG. 8, the background color is configured to be lightened as the setting check screen transits from 53F through 53G to 53H with time, which is useful as a way of showing the result of the duration measurement when a color panel is employed as the display 22, for example.

The background color may be configured to be darkened as the setting check screen transits from 53F through 53G to 53H unlike the case of FIG. 8. In this case, the settings can be sufficiently checked on the setting check screen even if the display 22 is monochrome.

Other ways of displaying the result of the duration measurement than those described with reference to FIG. 8 may be employed. For example, counting down a number on the setting check screen 53 may be employed to show the remaining time.

The variation shown in FIG. 9 is to display the setting check screens 53 different in language in a switching manner during the time when a key of the numeric keypad of the operation keys 210 is kept pressed. The setting check screens 53 show the settings in different languages (e.g., English and German).

For example, as shown in FIG. 9, a setting check screen 53D shown in English as a first language and a setting check screen 53E shown in German as a second language are prepared as the setting check screens 53. In the case of FIG. 9, the settings of the paper feed cassette 32 ("Cassette 1") assigned to the "1" key of the numeric keypad 210A is displayed.

The setting check screens 53D and 53E are alternately displayed on the display 22 as long as the key of the numeric keypad 210A is kept pressed.

According to the present variation, the settings of the paper feed cassettes 32 can be reliably checked without the need of changing language settings even when a plurality of users who understand different languages use the apparatus.

[Others]

The embodiment of the present disclosure has been described so far. However, the present disclosure is not limited thereto. For example, the paper feed cassettes 32 may be assigned to other operation keys 210 than the keys of the numeric keypad 210A although the cases where the paper feed cassettes 32 are assigned to the keys of the numeric keypad 210A has been described in the embodiment above.

What is claimed is:

1. An image forming apparatus comprising:
a storage section configured to store settings of a plurality of paper feed cassettes accommodating paper;
an operating section having a plurality of operation keys configured to be pressed for inputting operation;
an assignment and management section configured to assign, in one-to-one correspondence, the plurality of paper feed cassettes to the plurality of operation keys to manage the respective paper feed cassettes;
a press detecting section configured to detect press of any of the operation keys; and
a display processing section configured to display, during the time when any of the operation keys is kept pressed, a setting check screen showing the settings of the paper feed cassette assigned to the operation key being pressed,
wherein the display processing section displays icon images representing the respective paper feed cassettes and including identification information of the corresponding operation keys as well as identification information of the paper feed cassettes during the time when the apparatus is in a standby state, each of the icon images shows a size and an amount of the paper remaining in the paper feed cassette assigned to the corresponding operation key, the operation keys are numeric keys in a specified arrangement, the assignment and management section assigns the paper feed cassettes to the numeric keys to manage the paper feed cassettes, and the display processing section displays the icon images in an arrangement corresponding to the arrangement of the numeric keys.

2. An image forming apparatus according to claim 1, further comprising:

a duration measuring section configured to measure a key press duration during which the operation key is kept pressed, wherein when the key press duration is longer than a predetermined period of time, the display processing section displays a setting screen on which the settings of the paper feed cassette assigned to the operation key being pressed are made.

3. An image forming apparatus according to claim 2, wherein the display processing section displays on the setting check screen a duration measurement result showing a transition duration before the setting screen is displayed.

4. An image forming apparatus according to claim 2, further comprising:

a setting processing section configured to receive input of the settings of the paper feed cassettes on the setting screen and execute the settings.

5. An image forming apparatus according to claim 1, wherein the settings include a size, a type, and an amount of the paper remaining in the paper feed cassette assigned to the operation key being pressed.

6. An image forming apparatus according to claim 1, wherein the display processing section displays a plurality of setting check screens different in language in a switching manner during the time when the operation key is kept pressed, the setting check screens showing the settings in different languages.

7. A method for displaying a screen, comprising storing settings of a plurality of paper feed cassettes accommodating paper;

assigning, in one-to-one correspondence, the plurality of paper feed cassettes to a plurality of operation keys to be pressed for inputting operation to manage the respective paper feed cassettes;

detecting press of any of the operation keys;

displaying, during the time when any of the operation keys is kept pressed, a setting check screen showing the settings of the paper feed cassette assigned to the operation key being pressed; and displaying icon images representing the respective paper feed cassettes and including identification information of the corresponding operation keys as well as identification information of the paper feed cassettes during the time when the apparatus is in a standby state, wherein each of the icon images shows a size and an amount of the paper remaining in the paper feed cassette assigned to the corresponding operation key, the operation keys are numeric keys in a specified arrangement, in the assigning, the paper feed cassettes are assigned to the numeric keys to manage the paper feed cassettes, and in the displaying icon images, the icon images are displayed in an arrangement corresponding to the arrangement of the numeric keys.

8. A non-transitory computer-readable storage medium storing a display program configured to provide a computer with:

a storing function of storing settings of a plurality of paper feed cassettes accommodating paper;

an assigning and managing function of assigning, in one-to-one correspondence, the plurality of paper feed cassettes to a plurality of operation keys to be pressed for inputting operation to manage the respective paper feed cassettes;

a key press detecting function of detecting press of any of the operation keys; and a display processing function of displaying, during the time when any of the operation keys is kept pressed, a setting check screen showing the settings of the paper feed cassette assigned to the operation key being pressed, wherein the display processing function includes displaying icon images representing the respective paper feed cassettes and including identification information of the corresponding operation keys as well as identification information of the paper feed cassettes during the time when the apparatus is in a standby state, each of the icon images shows a size and an amount of the paper remaining in the paper feed cassette assigned to the corresponding operation key, the operation keys are numeric keys in a specified arrangement, the paper feed cassettes are assigned to the numeric keys to manage the paper feed cassettes, and the icon images are displayed in an arrangement corresponding to the arrangement of the numeric keys.

* * * * *